United States Patent
Harding et al.

(10) Patent No.: US 7,648,646 B2
(45) Date of Patent: Jan. 19, 2010

(54) LC MATERIAL WITH HOMEOTROPIC ALIGNMENT

(75) Inventors: Richard Harding, Hants (GB); Matthew Francis, Walton (GB); Owain Llyr Parri, Hampshire (GB); Donald Gordon Graham, Dorset (GB); Shirley Ann Marden, Poole (GB)

(73) Assignee: Merck Patent Gesellschaft, Darmstadt (DE)

( * ) Notice: Subject to any disclaimer, the term of this patent is extended or adjusted under 35 U.S.C. 154(b) by 2 days.

(21) Appl. No.: 11/916,928

(22) PCT Filed: May 16, 2006

(86) PCT No.: PCT/EP2006/004608

§ 371 (c)(1),
(2), (4) Date: Jun. 10, 2008

(87) PCT Pub. No.: WO2006/131191

PCT Pub. Date: Dec. 14, 2006

(65) Prior Publication Data

US 2008/0316418 A1 Dec. 25, 2008

(30) Foreign Application Priority Data

Jun. 10, 2005 (EP) .................................. 05012560

(51) Int. Cl.
*C09K 19/00* (2006.01)
*C09K 19/06* (2006.01)
*C09K 19/52* (2006.01)

(52) U.S. Cl. ...................... 252/299.01; 428/1.1; 430/20; 349/179

(58) Field of Classification Search ............ 252/299.01; 428/1.1; 430/20; 349/179
See application file for complete search history.

(56) References Cited

U.S. PATENT DOCUMENTS

| 5,456,867 | A | 10/1995 | Mazaki et al. |
| 5,805,253 | A | 9/1998 | Mori et al. |
| 6,379,758 | B1 | 4/2002 | Hanmer et al. |
| 6,816,218 | B1 | 11/2004 | Coates et al. |
| 2002/0039627 | A1 | 4/2002 | Ichihashi et al. |
| 2003/0003246 | A1 | 1/2003 | Negoro et al. |
| 2004/0263736 | A1 | 12/2004 | Graham et al. |
| 2005/0179003 | A1 | 8/2005 | Heckmeier |
| 2006/0051523 | A1 | 3/2006 | Morishima |
| 2006/0066804 | A1* | 3/2006 | Tasaka ................. 349/179 |

FOREIGN PATENT DOCUMENTS

| WO | WO 0244801 A | 6/2002 |
| WO | WO 03098337 A | 11/2003 |

* cited by examiner

*Primary Examiner*—Geraldina Visconti
(74) *Attorney, Agent, or Firm*—Millen, White, Zelano & Branigan, P.C.

(57) ABSTRACT

The invention relates to a liquid crystal (LC) material that aligns homeotropically on substrates with high or low surface energy.

13 Claims, 3 Drawing Sheets

US 7,648,646 B2

LC MATERIAL WITH HOMEOTROPIC ALIGNMENT

FIELD OF INVENTION

The invention relates to a liquid crystal (LC) material that aligns homeotropically on substrates with high or low surface energy.

BACKGROUND AND PRIOR ART

In liquid crystal displays (LCDs) it is often required to control the alignment of the LC medium. This is typically achieved using an alignment layer. Reviews of conventional alignment techniques are given for example by 1. Sage in "Thermotropic Liquid Crystals—Applications and Uses Vol. 3" edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77. These alignment techniques and materials can be used to align both conventional LC materials and polymerizable LC materials, also known as reactive mesogens (RM) and reactive mesogen mixtures (RMMs).

Typically, high surface energy substrates are used to obtain homogeneous (planar) alignment of LCs. For example, rubbed polyimide, TAC or PET films are often used to obtain planar alignment of LCs. Other, less common polar materials, e.g. cellulose nitrate have also been reported as alignment layers, for example in U.S. Pat. No. 5,805,253.

In prior art various alignment methods have been used to achieve homeotropic (perpendicular) alignment of LC materials. The simplest is to use a substrate with a low surface energy (e.g. PTFE). In this case the energy of the system is minimised by having the LC molecules in contact with each other rather than with the surface, resulting in homeotropic alignment. Unfortunately, this approach is limited and there are few examples of low surface energy, plastic substrates of the optical quality required for use in LCDs.

In prior art there are examples of other ways to homeotropically align thin layers of LC materials, but these usually require an alignment layer. For example, a substrate is coated with a surfactant that 'seeds' homeotropic alignment (e.g. lecithin). Other examples exist where a plastic substrate is coated with a low surface energy alignment layer, as disclosed for example in U.S. Pat. No. 5,456,867, U.S. Pat. No. 6,379,758 and U.S. Pat. No. 6,816,218. It has also been suggested in prior art to use a thin, polymerised layer of homeotropically aligned RMM as an alignment layer for inducing homeotropic alignment of LCs, as disclosed for example in WO 02/44801. However, in the method according to WO02/44801 the initial RMM still required the use of an alignment layer (silica treated PET) to achieve the initial homeotropic alignment.

Unfortunately, the use of an alignment layer adds extra cost to the production of homeotropic films. This problem was investigated and partially overcome in US 2004/0263736 where a homeotropic LC layer is aligned directly on top of a planar RMM layer. This combination of RMM films offers one solution to compensate LCDs of the in-plane-switching (IPS) mode. However, it is most desirable to be able to homeotropically align an RMM on any substrate.

One aim of the present invention is to provide an alignment layer, and methods and materials for its preparation, which provides uniform and stable alignment of LCs applied thereon, is easy to manufacture, in particularly for mass production, and does not have the drawbacks of prior art alignment layers and materials described above. Other aims of the present invention are immediately evident to the person skilled in the art from the following detailed description.

The inventors have found that these aims can be achieved by using materials and methods as described in the present invention. Thus, the present invention provides an RM material that aligns homeotropically on both low and high surface energy substrates, where the substrate can be inorganic, or organic (e.g. plastic film, polymerized RM or LC film, etc.).

DEFINITION OF TERMS

The term "liquid crystal or mesogenic material" or "liquid crystal or mesogenic compound" means materials or compounds comprising one or more rod- or board-shaped (calamitic) or disk-shaped (discotic) mesogenic groups, i.e. groups with the ability to induce liquid crystal (LC) phase behaviour. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerized. The term "reactive mesogen (RM)" means a polymerizable mesogenic compound or polymerizable liquid crystal compound.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

SUMMARY OF THE INVENTION

The invention relates to an, optionally polymerizable, liquid crystal (LC) material that aligns homeotropically on a substrate, comprising one or more mesogenic or LC compounds and one or more polar additives that are soluble in the LC material and increase the surface energy of the LC material.

The invention further relates to a film comprising a polymerized LC material with homeotropic alignment as described above and below.

The invention further relates to the use of a film as described above and below in liquid crystal displays (LCDs) or other optical or electrooptical components or devices, for decorative or security applications.

DETAILED DESCRIPTION OF THE INVENTION

Figure 1:
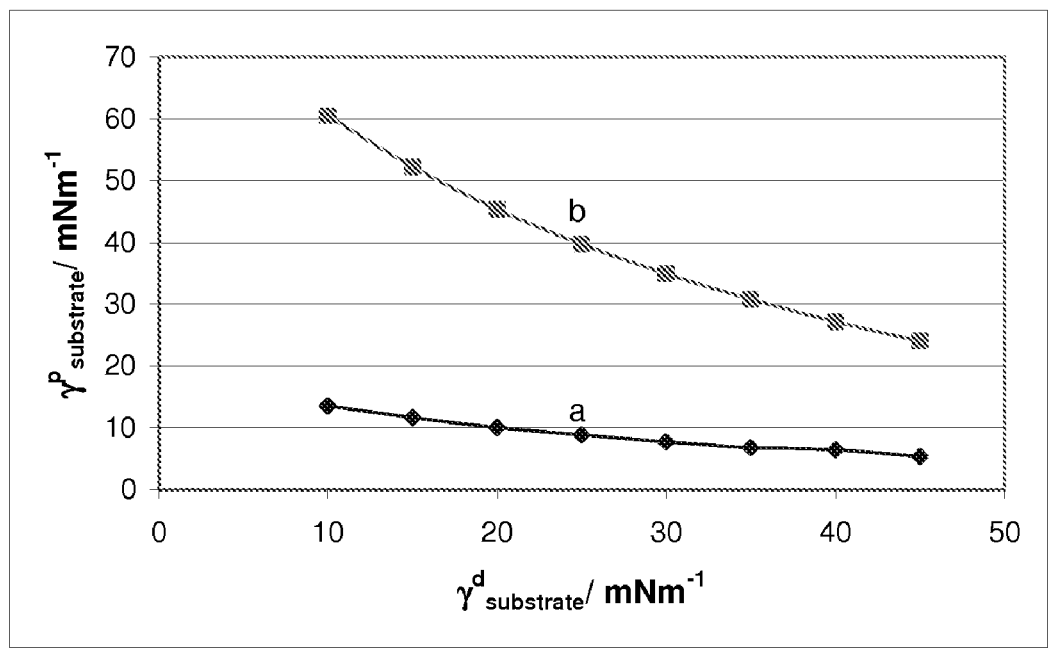
FIG. 1 shows the theoretical alignment of an RMM solution according to example 1 with and without a polar additive, on substrates with different surface energies ($\gamma^p$=polar contribution and $\gamma^d$=dispersive contribution to the substrate surface energy).
Figure 2:
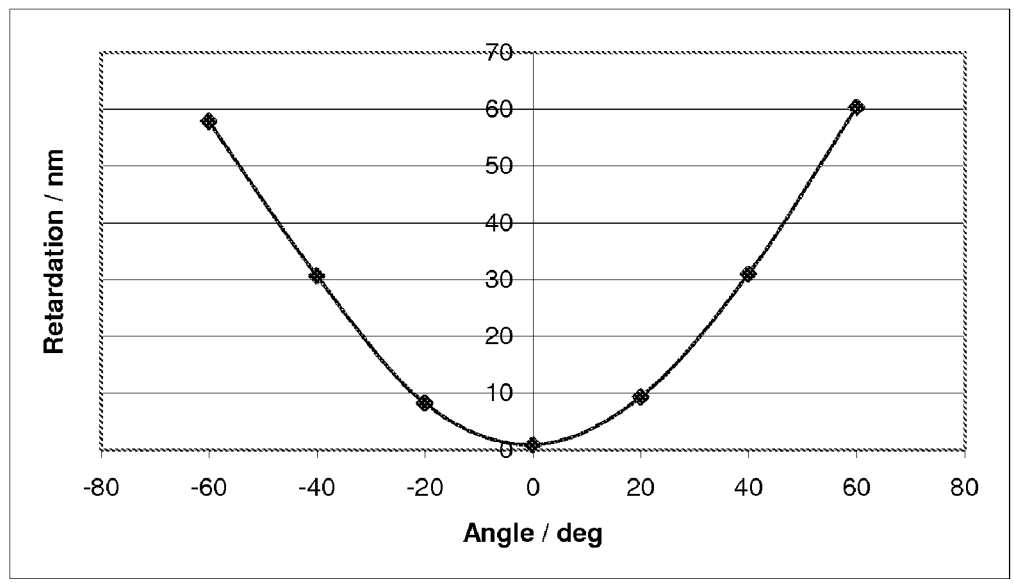
FIGS. 2-5 show the retardation of polymerized films obtained by polymerizing an RMM solution according to example 1 on different substrates.
Figure 3:
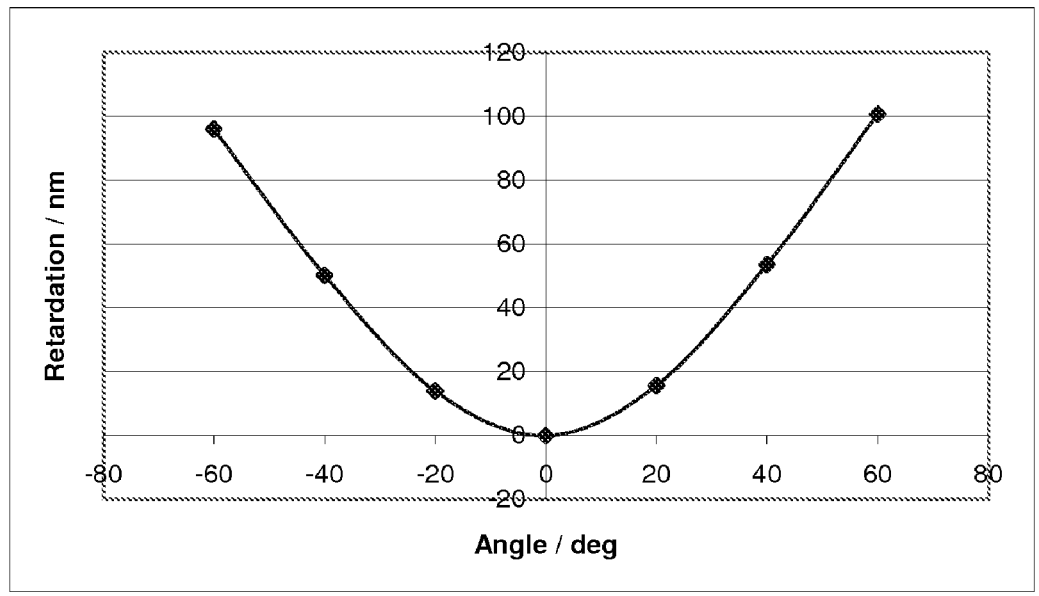
Figure 4:
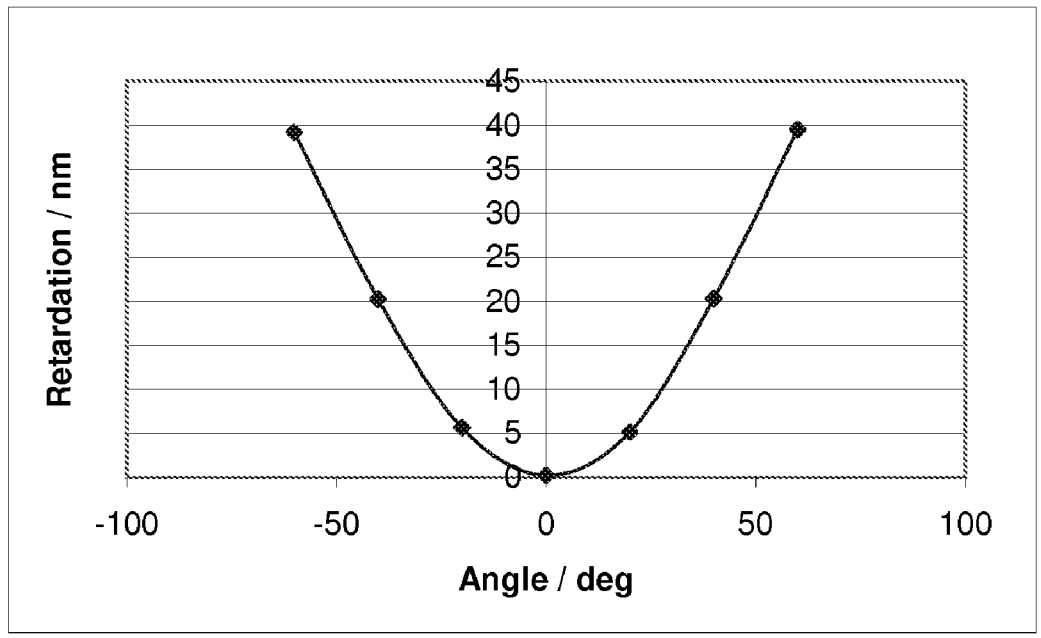
Figure 5:
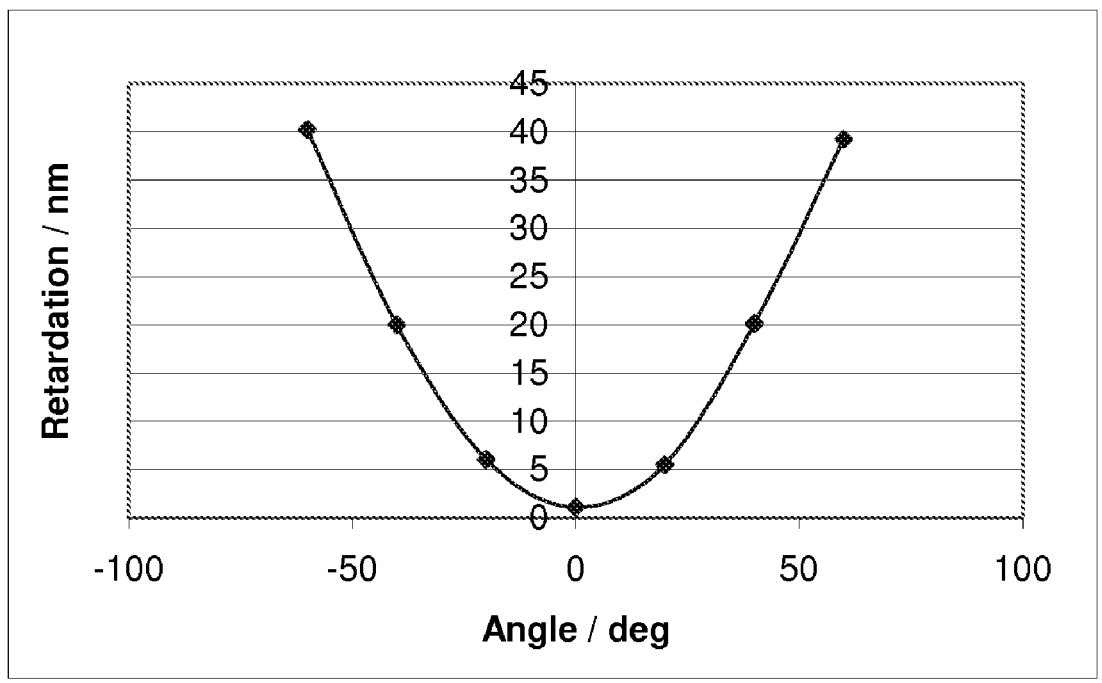

In prior art homeotropic alignment of LCs is usually achieved by reducing the surface energy of the substrate. The difference in surface energy of the substrate and the surface tension of the LC results in homeotropic alignment. For homeotropic alignment it is usually necessary to have a LC with a higher surface tension than the surface energy of the substrate. It was reported in prior art that this difference can be considered in terms of both dispersive and polar contributions of the surface energy/tension (see S. Naemura *Mol. Cryst. Liq. Cryst.* 68, 183 (1981)). Therefore, it should be possible to achieve homeotropic alignment of LC materials on any given substrate if the surface tension of the LC is increased.

The inventors of the present invention have now found that polar cellulose derivatives, in particular cellulose esters like cellulose nitrate are suitable additives to induce homeotropic alignment of an LC material. Cellulose nitrate is a highly polar material and its molecules have a rod-like shape, therefore it shows good solubility in LC materials. When added to a mixture of RMs, cellulose nitrate results in an increased polar RMM. It was also found that adding already a small amount of cellulose nitrate to an LC mixture promotes homeotropic alignment of the LCs even on very polar surfaces (which are typically used to promote planar alignment). In this way, it is possible to induce homeotropic alignment on, for example, TAC and PET films and high surface energy polyimide (e.g. JSR AL1054).

Especially preferred are the following LC materials and films:
 the material comprises one or more organic solvents,
 the material is polymerizable, preferably by thermal polymerization or photopolymerization,
 the material spontaneously adopts homeotropic alignment both on substrates with high and low surface energy,
 the polar additive has a rigid rod-like molecular shape,
 the polar additive has a dielectric constant from +3 to +10, preferably from +3.7 to +7.5, very preferably from +6.0 to +7.3,
 the polar additive is soluble in the LC material (without solvent) in a concentration of at least 0.1% by weight, preferably at least 0.5 to 1% by weight,
 the polar additive is a cellulose derivative, preferably a cellulose ester,
 the polar additive is selected from cellulose nitrate, cellulose acetate, cellulose propionate, cellulose butyrate or mixed esters like cellulose acetate butyrate or cellulose acetate propionate,
 the concentration of the polar additive in the LC material (without solvents) is from 0.1 to 5%, preferably from 0.1 to 2%, very preferably from 0.2 to 1%,
 the film thickness is from 0.1 to 5 microns,
 the film thickness is from 1 to 4 microns,
 the surface tension of the LC material (without solvents) is from 25 to 75 mNm$^{-1}$, preferably from 35 to 75 mNm$^{-1}$, very preferably from 45 to 70 mNm$^{-1}$.

The solvents are preferably chosen to dissolve the LC compounds and the polar additive. Especially preferred solvents are selected from cyclohexanone, toluene, xylene, isoproyl alcohol, or mixtures thereof, for example binary mixtures like toluene/cyclohexanone or toluene/isopropyl alcohol.

The LC material is preferably a polymerizable LC material, very preferably a mixture of two or more compounds, at least one of which is a polymerizable or crosslinkable compound. Polymerizable compounds with one polymerizable group are also referred to as "monoreactive". Crosslinkable compounds, i.e. having two or more polymerizable groups, are also referred to as "di- or multireactive".

Especially preferred is a polymerizable LC material comprising
a) one or more monoreactive RMs,
b) optionally one or more di- or multireactive RMs,
c) one or more polar additives with good solubility in the LC material, preferably with a rigid rod-like molecular shape,
d) optionally one or more photoinitiators,
e) optionally one or more mono-, di- or multireactive polymerizable non-mesogenic compounds,
f) optionally one or more chain transfer agents,
g) optionally one or more surface-active compounds,
h) optionally one or more stabilizers,
i) optionally one or more solvents.

Very preferred is a polymerizable material comprising one or more monoreactive RM and one or more di- or multireactive RMs.

Further preferred is a polymerizable material comprising one or more monoreactive achiral RMs and one or more di- or multireactive achiral RMs.

The RMs are preferably monomers, very preferably calamitic monomers. These materials typically have good optical properties, like reduced chromaticity, and can be easily and quickly aligned into the desired orientation, which is especially important for the industrial production of polymer films at large scale. It is also possible that the polymerizable material comprises one or more discotic monomers.

The polymerizable materials as described above and below are another aspect of the invention.

Mono-, di- and multireactive RMs that are suitable for the present invention can be prepared by methods which are known per se and which are described in standard works of organic chemistry like for example Houben-Weyl, Methoden der organischen Chemie, Thieme-Verlag, Stuttgart.

Suitable RMs for use as monomer or comonomer in a polymerizable LC mixture are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578.

Examples of suitable and preferred RMs are shown in the following list.

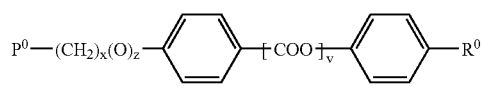

(R1)

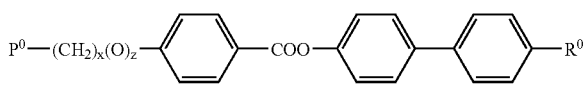

(R2)

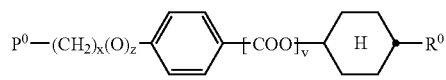

(R3)

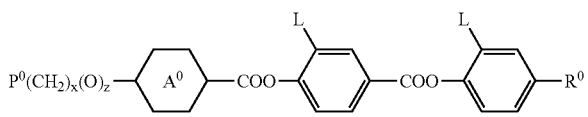

(R4)

-continued
(R5) 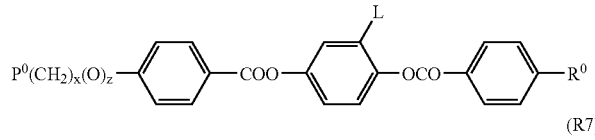
(R6) 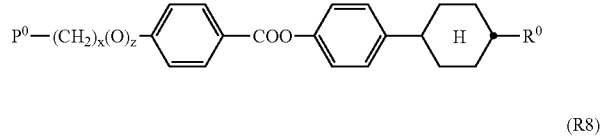
(R7) 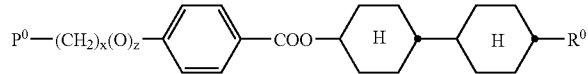
(R8) 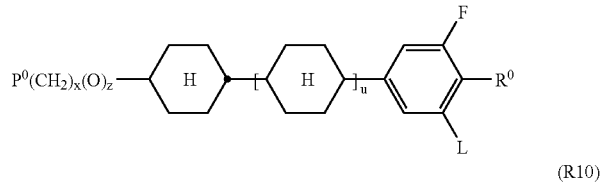
(R9) 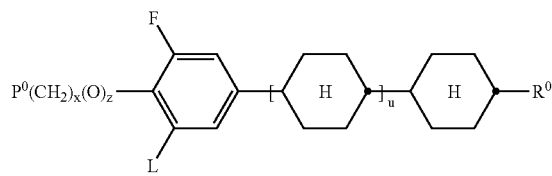
(R10) 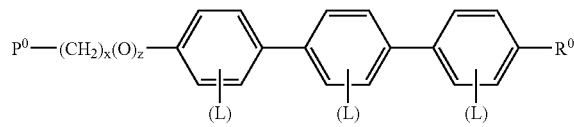
(R11) 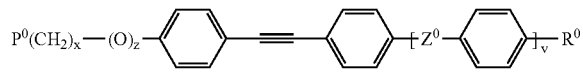
(R12) 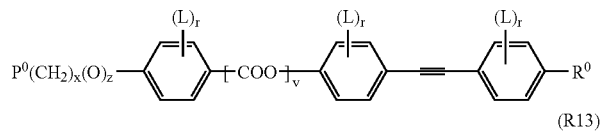
(R13) 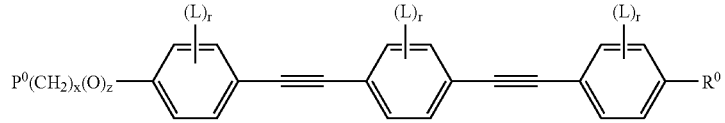
(R14) 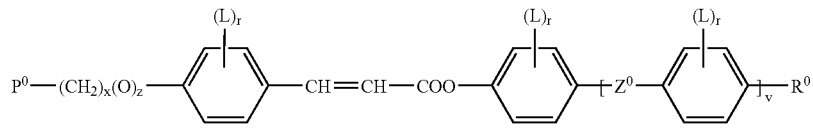
(R15) 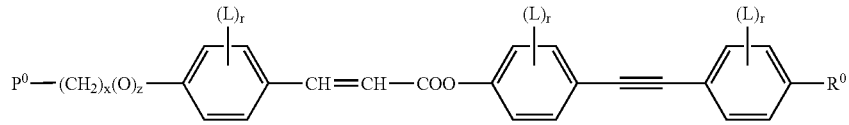
(R16) 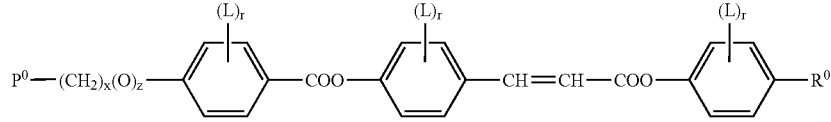
(R17) 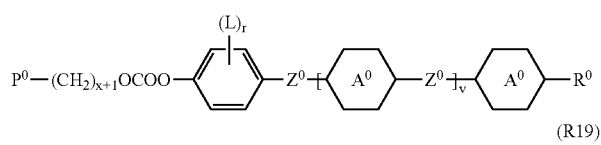
(R18) 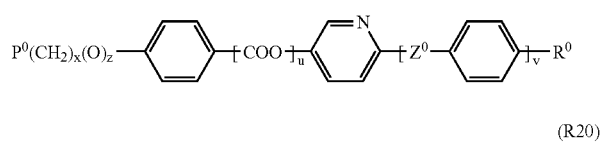
(R19) 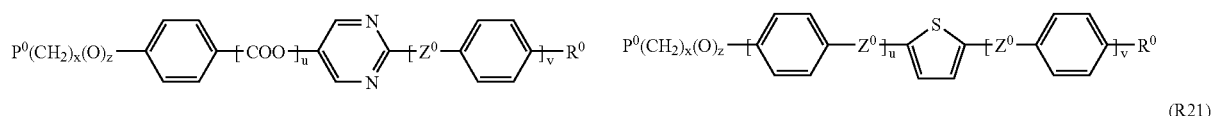
(R20) 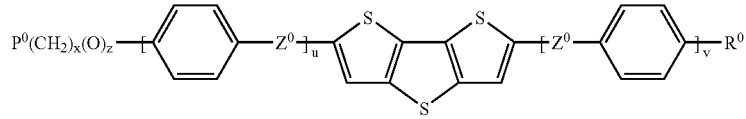
(R21)

-continued

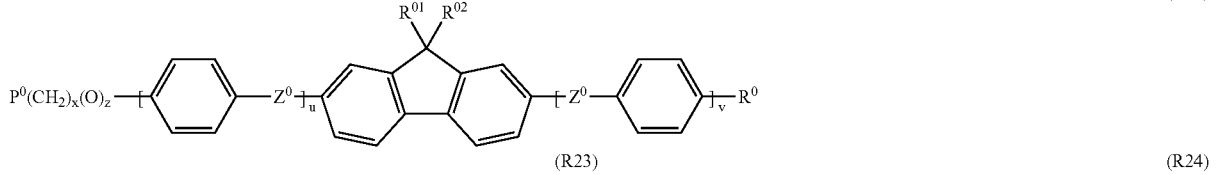
(R22)

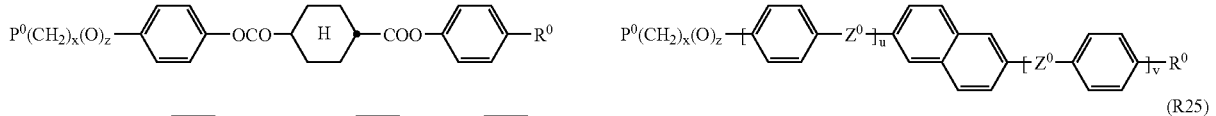
(R23) (R24)

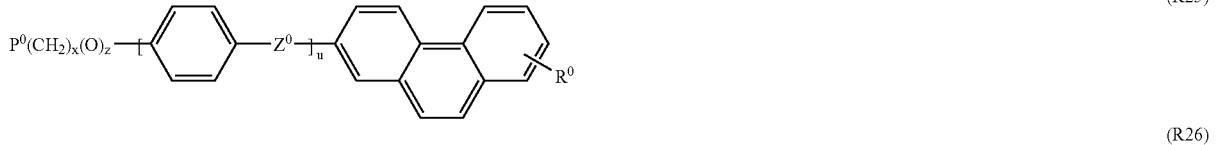
(R25)

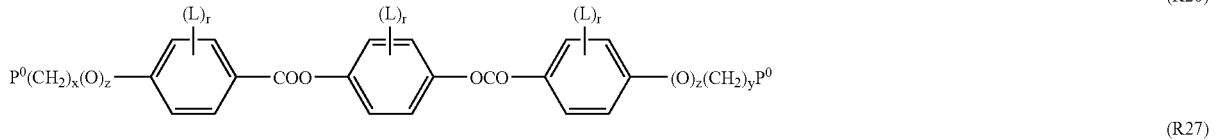
(R26)

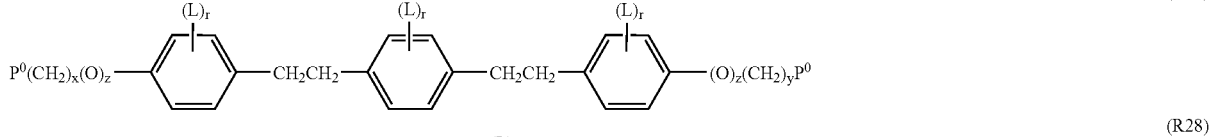
(R27)

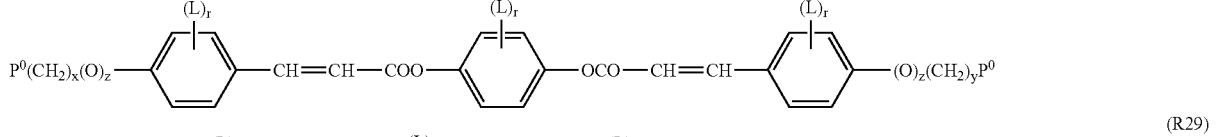
(R28)

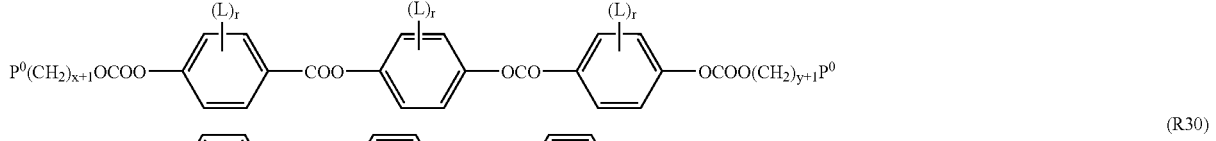
(R29)

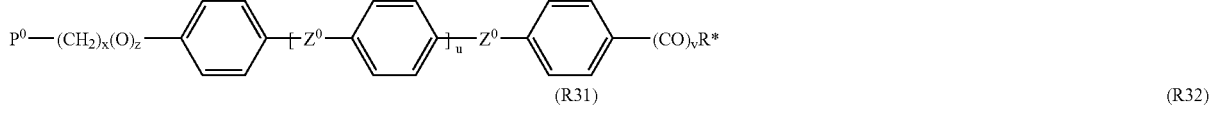
(R30)

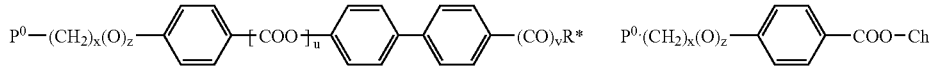
(R31) (R32)

wherein
$P^0$ is, in case of multiple occurrence independently of one another, a polymerizable group, preferably an acryl, methacryl, oxetane, epoxy, vinyl, vinyloxy, propenyl ether or styrene group,
r is 0, 1, 2, 3 or 4,
x and y are independently of each other 0 or identical or different integers from 1 to 12,
z is 0 or 1, with z being 0 if the adjacent x or y is 0,
$A^0$ is, in case of multiple occurrence independently of one another, 1,4-phenylene that is optionally substituted with 1, 2, 3 or 4 groups L, or trans-1,4-cyclohexylene,
u and v are independently of each other 0 or 1,
r1 and r2 are independently of each other 0, 1, 2, 3 or 4,
$Z^0$ is, in case of multiple occurrence independently of one another, —COO—, —OCO—, —CH$_2$CH$_2$—, —C≡C—, —CH═CH—, —CH═CH—COO—, —OCO—CH═CH— or a single bond, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—,
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, $R^0$ or $Y^0$,
R* is a chiral alkyl or alkoxy group with 4 or more, preferably 4 to 12 C atoms, like 2-methylbutyl, 2-methyloctyl, 2-methylbutoxy or 2-methyloctoxy,
Ch is a chiral group selected from cholesteryl, estradiol, or terpenoid radicals like menthyl or citronellyl,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, and wherein the benzene rings can additionally be substituted with one or more identical or different groups L.

Suitable unpolymerizable chiral compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany). Suitable polymerizable chiral compounds are for example compounds (R30) to (R32) listed above, or the polymerizable chiral material Paliocolor® LC756 (from BASF AG, Ludwigshafen, Germany).

Unless stated otherwise, the general preparation of polymer LC films according to this invention can be carried out according to standard methods known from the literature.

Typically the polymerizable LC material is coated or otherwise applied onto a substrate where it aligns or is aligned into uniform orientation, and polymerized in situ at a selected temperature by photopolymerization, very preferably by UV-photopolymerization, to fix the alignment of the LC molecules. If necessary, uniform orientation can be promoted by additional means like shearing and/or annealing the LC material, surface treatment of the substrate, or adding surfactants to the LC material. It is also possible to induce or improve alignment by annealing the polymerizable LC material at elevated temperature, preferably at its polymerization temperature, prior to polymerization.

As substrate for example glass or quartz sheets or plastic films can be used. It is also possible to put a second substrate on top of the coated material prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerizable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable material in a suitable solvent. This solution is then coated or printed onto the substrate, for example by spin-coating or printing or other known techniques, and the solvent is evaporated off before polymerization. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Polymerization is achieved by exposing the polymerizable material to polarized light, like UV light, IR light or visible light, preferably UV light. As a source for actinic radiation for example a single UV lamp or a set of UV lamps can be used. When using a high lamp power the curing time can be reduced. Another possible light source is a laser, like for example a UV, IR or visible laser.

As polymerization initiator, typically standard photoinitiators are used. Suitable radicalic photoinitiators are for example the commercially available Irgacure® or Darocure® (Ciba Geigy A G, Basel, Switzerland).

The polymerizable material may also comprise one or more stabilizers or inhibitors to prevent undesired spontaneous polymerization, like for example the commercially available Irganoxe (Ciba Geigy A G, Basel, Switzerland).

The curing time depends, inter alia, on the reactivity of the polymerizable material, the thickness of the coated layer, the type of polymerization initiator and the power of the UV lamp. The curing time is preferably $\leq 5$ minutes, very preferably $\leq 3$ minutes, most preferably $\leq 1$ minute. For mass production short curing times of $\leq 30$ seconds are preferred.

Preferably polymerization is carried out in an inert gas atmosphere like nitrogen or argon.

The polymerizable material may also comprise one or more dyes having an absorption maximum adjusted to the wavelength of the radiation used for polymerization, in particular UV dyes like e.g. 4,4"-azoxy anisole or Tinuvin® dyes (from Ciba A G, Basel, Switzerland).

In another preferred embodiment the polymerizable material comprises one or more monoreactive polymerizable non-mesogenic compounds, preferably in an amount of 0 to 50%, very preferably 0 to 20%. Typical examples are alkylacrylates or alkylmethacrylates.

In another preferred embodiment the polymerizable material comprises one or more di- or multireactive polymerizable non-mesogenic compounds, preferably in an amount of 0 to 50%, very preferably 0 to 20%, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerizable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerizable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerizable material does not contain a binder or dispersion auxiliary.

The polymerizable material can additionally comprise one or more additional components like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The polymer film of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The polymer film of the present invention can also be used as alignment layer for LC materials. For example, it can be used in an LCD to induce or improve alignment of the switchable LC medium, or to align a subsequent layer of polymerizable LC material coated thereon. In this way, stacks of polymerized LC films can be prepared.

The polymer film of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned) or PVA (patterned vertically aligned) mode; displays with bend or hybrid alignment like the OCB (optically compensated bend cell or optically compensated birefringence), R—OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase like those described in WO 02/93244.

In the foregoing and the following, all temperatures are given in degrees Celsius, and all percentages are by weight, unless stated otherwise. The following abbreviations are used to illustrate the LC phase behaviour: C, K=crystalline; N=nematic; S=smectic; N*, Ch=chiral nematic or cholesteric; I=isotropic. The numbers between these symbols indicate the phase transition temperatures in degree Celsius. Furthermore, mp is the melting point and cp is the clearing point (in ° C.).

Unless stated otherwise, values of physical properties like the dielectric constant or the surface tension refer to 20° C.

Unless stated otherwise, the precentages of components of a polymerizable mixture as given above and below refer to the total amount of solids in the polymerizable mixture, i.e. not including solvents.

The examples below shall illustrate the invention without limiting it.

EXAMPLE 1

The nematic RM solution RMS1 is formulated as follows:

| | |
|---|---|
| Compound (1) | 6.16% |
| Compound (2) | 6.92% |
| Compound (3) | 10.78% |
| Compound (4) | 6.92% |
| Irgacure 907 ® | 1.85% |
| Irganox 1076 ® | 0.03% |
| Dodecanol | 0.34% |
| Xylene | 67% |

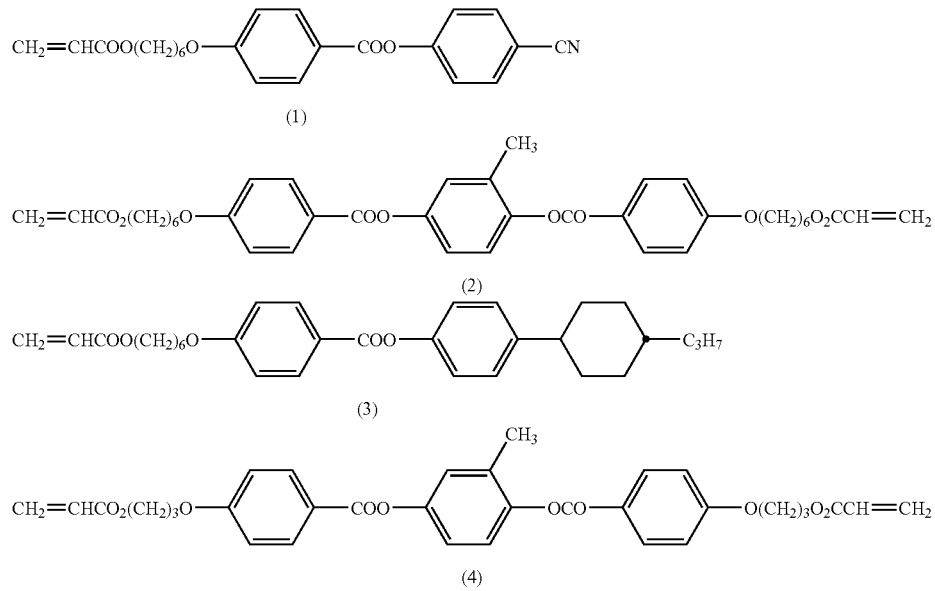

RMS1 is designed to align homeotropically on a low surface energy substrate, e.g. glass.

The nematic RM solution RMS2 is formulated by adding 1% celluose nitrate (supplied in 30% isopropylalcohol, available from Sigma Aldrich, 12% nitrogen content, molecular weight=1044.6) to the solution RMS1.

FIG. 1 shows theoretical limits of substrate surface energy ($\gamma^p$=polar contribution $\gamma^d$=dispersive contribution) to achieve homeotropic alignment of solutions RMS1 (a) and RMS2 (b)

Curves (a) and (b) correspond to the maximum surface energy of a substrate on which the respective material can still align homeotropically, i.e. a substrate having a surface energy value below the curve will align the respective material homeotropically. The values are calculated according to S, Naemura Mol. Cryst. Liq. Cryst. 68, 183 (1981).

The pure solution RMS1 has a surface tension of $\gamma^d$=40.3 mNm$^{-1}$ and $\gamma^p$=6 mNm$^{-1}$. Thus, according to FIG. 1 such material should align homeotropically only on substrates with a surface energy value below curve (a). The solution RMS2 comprising cellulose nitrate has a much greater surface tension $\gamma^d$=42 mNm$^{-1}$ and $\gamma^p$=26 mNm$^{-1}$, allowing it to align homeotropically on substrates with a surface energy value below curve (b), covering a much wider range of possible substrates.

Thus, adding cellulose nitrate to an RM solution significantly increases the range over which homeotropic alignment of the RMs can be achieved. This is verified by the examples below.

EXAMPLE 2

Various substrates are prepared. These are (i) clean glass, (ii) TAC (used as supplied from LoFo) and (iii) saponified TAC. The saponified TAC is prepared by immersing samples of the LoFo TAC film in 15 wt % aqueous sodium hydroxide solution for 3 minutes. Subsequently the treated TAC film is washed with distilled water and dried overnight in air. The surface energies of the substrates are determined from contact angle measurements using a Kruss DSA-10 instrument and are shown in Table 1.

| Substrate | $\gamma_{tot}$/mNm$^{-1}$ | $\gamma_d$/mNm$^{-1}$ | $\gamma_p$/mNm$^{-1}$ |
|---|---|---|---|
| Glass | 45.0 | 40.0 | 5.0 |
| TAC | 50.5 | 40.6 | 9.9 |
| Saponified TAC | 68.1 | 42.6 | 25.5 |

The solutions RMS1 (without cellulose nitrate) and RMS2 (with cellulose nitrate) of example 1 are coated on to the above-mentioned substrates and polymerised (20 mWcm$^{-2}$ UV-A, 60 s, nitrogen). Where uniform films can be produced, the retardation of the polymerised films, as a function of viewing angle, is measured to verify the homeotropic alignment of the RMM. The results are shown in FIGS. 2-5.

RMS1 on glass: Homeotropic film produced (see FIG. 2).
RMS1 on TAC: Scattering, non-homeotropic film produced
RMS2 on glass: Homeotropic film produced (see FIG. 3).
RMS2 on TAC: Homeotropic film produced (see FIG. 4).
RMS2 on saponified TAC: Homeotropic film produced (see FIG. 5).

These examples show that homeotropic alignment of typical LC materials (without polar additive) is only possible on relatively low polar (low surface energy) substrates like glass. In contrast, the LC materials according to the present invention (with polar additive) can align homeotropically on quite polar (high surface energy) substrates like TAC or saponified TAC.

The invention claimed is:

1. Liquid crystal (LC) material that aligns homeotropically on a substrate, comprising one or more mesogenic or LC compounds and one or more polar additives that are soluble in the LC material and increase the surface energy of the LC material.

2. LC material according to claim 1, which is polymerizable.

3. LC material according to claim 1, wherein the polar additive has a rigid rod-like shape.

4. LC material according to claim 1, wherein the polar additive is a cellulose derivative or cellulose ester.

5. LC material according to claim 1, wherein the polar additive is cellulose nitrate, cellulose acetate, cellulose propionate, cellulose butyrate, cellulose acetate butyrate or cellulose acetate propionate.

6. LC material according to claim 1, wherein the concentration of the polar additive in the material (without solvents) is 0.1 to 5%.

7. LC material according to claim 1, which comprises one or more monoreactive and one or more di- or multireactive RMs.

8. EC material according to claim 1, which comprises
 a) one or more monoreactive RMs,
 b) optionally one or more di- or multireactive RMs,
 c) one or more polar additives with good solubility in the LC material,
 d) optionally one or more photoinitiators,
 e) optionally one or more mono-, di- or multireactive polymerizable non-mesogenic compounds,
 f) optionally one or more chain transfer agents,
 g) optionally one or more surface-active compounds,
 h) optionally one or more stabilizers and
 i) optionally one or more solvents.

9. Homeotropic film comprising a polymerized LC material with homeotropic alignment, wherein said LC material is according to claim 1.

10. Homeotropic film according to claim 9, which has a thickness of 0.1 to 5 microns.

11. A liquid crystal display, optical or electrooptical component or device, decorative or security application, comprising a LC material according to claim 1.

12. A liquid crystal display, optical or electrooptical component, decorative or security marking comprising a homeotropic film comprising a polymerized LC material with homeotropic alignment, wherein said LC material is according to claim 1.

13. LC material according to claim 1, which comprises one or more monoreactive and one or more di- or multireactive RMs of the following formula

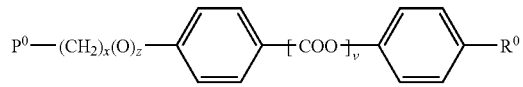
(R1)

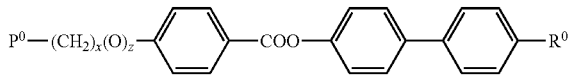
(R2)

-continued
(R3) 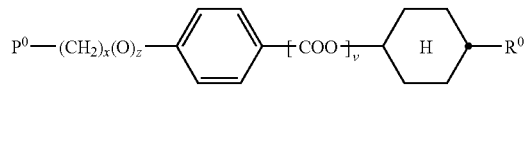
(R4) 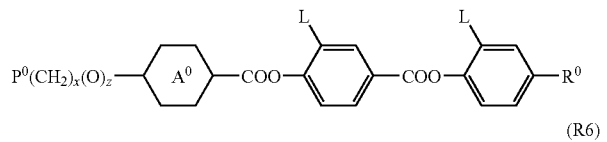
(R5) 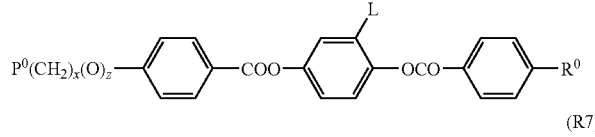
(R6) 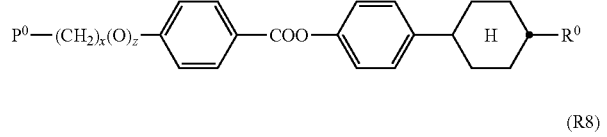
(R7) 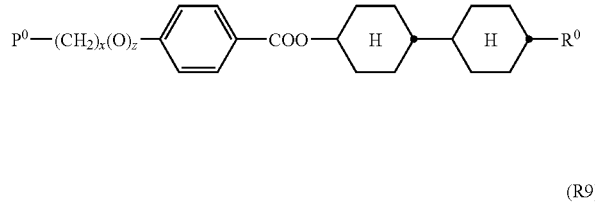
(R8) 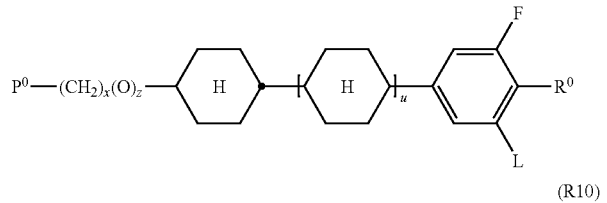
(R9) 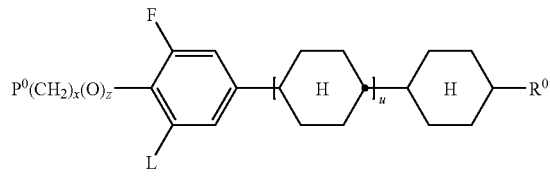
(R10) 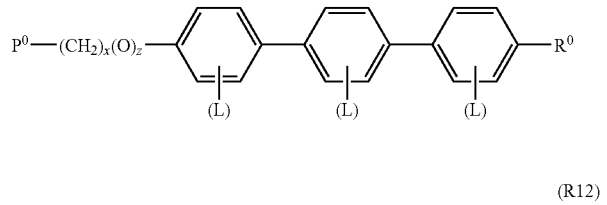
(R11) 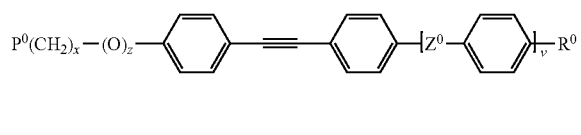
(R12) 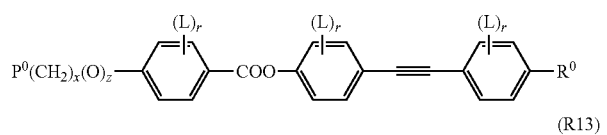
(R13) 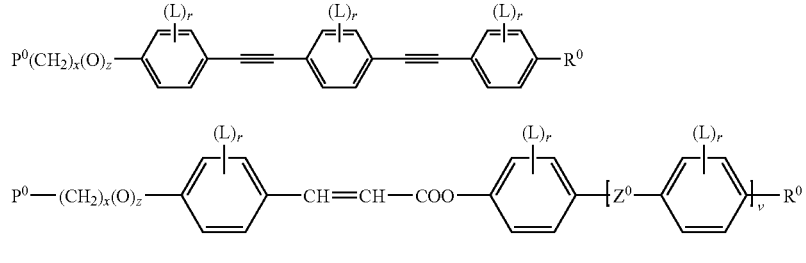
(R14) 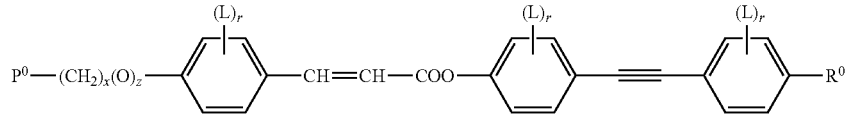
(R15) 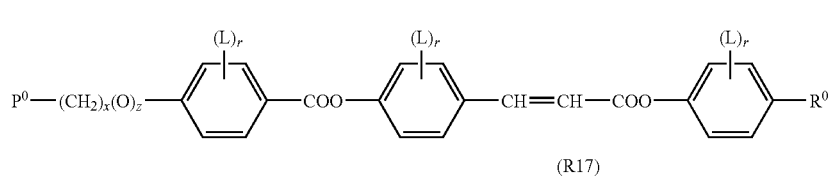
(R16) 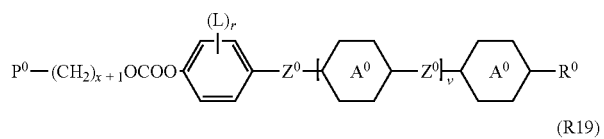
(R17) 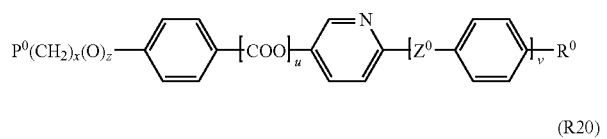
(R18) 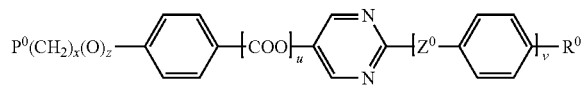
(R19) 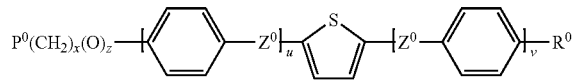
(R20)

-continued

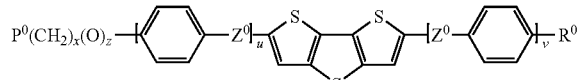
(R21)

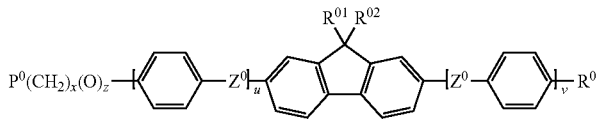
(R22)

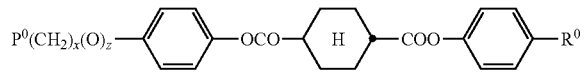
(R23)

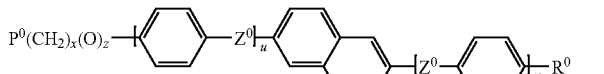
(R24)

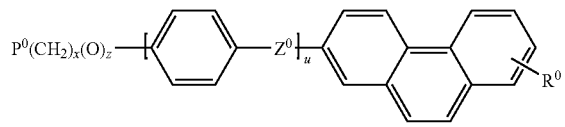
(R25)

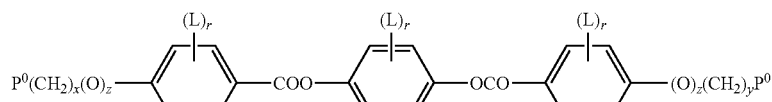
(R26)

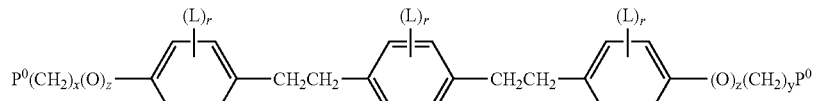
(R27)

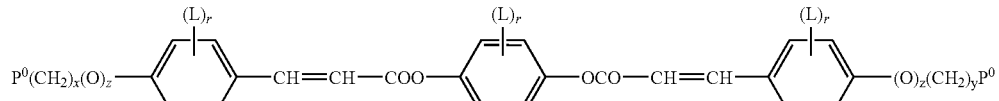
(R28)

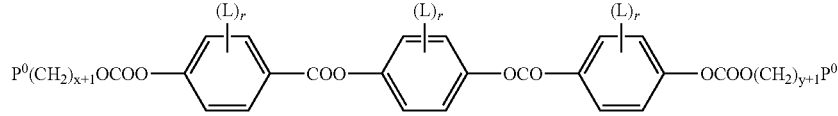
(R29)

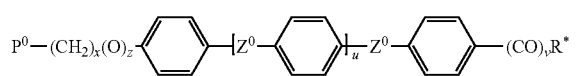
(R30)

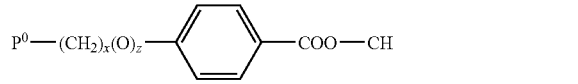
(R31)

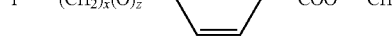
(R32)

wherein
$P^0$ is, in case of multiple occurrence independently of one another, a polymerizable group,
r is 0, 1, 2, 3 or 4,
x and y are independently of each other 0 or identical or different integers from 1 to 12,
z is 0 or 1, with z being 0 if the adjacent x or y is 0,
$A^0$ is, in case of multiple occurrence independently of one another, 1,4-phenylene that is optionally substituted with 1, 2, 3 or 4 groups L, or trans-1,4-cyclohexylene,
u and v are independently of each other 0 or 1,
r1 and r2 are independently of each other 0, 1, 2, 3 or 4,
$Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond,
$R^0$ is alkyl, alkoxy, thioalkyl, alkylcarbonyl, alkoxycarbonyl, alkylcarbonyloxy or alkoxycarbonyloxy with 1 or more C atoms which is optionally fluorinated, or is $Y^0$ or P—(CH$_2$)$_y$—(O)$_z$—,
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, $R^0$ or $Y^0$,
R* is a chiral alkyl or alkoxy group with 4 or more C atoms,
Ch is a chiral group selected from the group consisting of cholesteryl, estradiol, and terpenoid radicals,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
and wherein benzene rings can additionally be substituted with one or more identical or different groups L.

* * * * *